INVENTORS: A. L. SPITTLER
C. W. ZEBE
BY [signature]
ATTORNEY

United States Patent Office 3,493,686

Patented Feb. 3, 1970

3,493,686

TELEPHONE SWITCHING SYSTEM SERVING LONG CUSTOMER LOOPS AND SHORT CUSTOMER LOOPS

Alfred L. Spittler, El Dorado Hills, Calif., and Charles W. Zehe, New Shrewsbury, N.J., assignors to Bell Telephone Laboratories, Incorporated, Murray Hill and Berkeley Heights, N.J., a corporation of New York Filed Sept. 15, 1966, Ser. No. 579,659

Int. Cl. H04m *3/42*

U.S. Cl. 179—16 1 Claim

ABSTRACT OF THE DISCLOSURE

A crossbar telephone switching system is disclosed wherein some customer substations have a loop impedance substantially higher than that of other customers served by the same diameter wire loops. The high impedance loops are assigned only to line groups which do not contain loops having normal impedance levels, but all types of loops may share the same horizontal group. During a call, a range extender circuit is either inserted or bypassed in the connection depending upon whether the connection involves a high impedance loop or a normal impedance loop, respectively.

This invention relates to telephone switching systems, and more particularly, to telephone systems including range extension facilities for servicing substation lines which are longer than a predetermined distance from a telephone central office.

It is apparent to those conversant in telephone technology that telephone lines which are higher than a predetermined resistance ("long lines") will attenuate current flow to central office responsive equipment to an extent which may impair or degrade the satisfactory operation of the equipment. As an illustration, dial pulse receiving equipment at an office is designed to operate over a predetermined current range; if the current is diminished below an acceptable margin, the accuracy of operation is no longer predictable.

In the past, efforts have been made to service so-called "long" customer loops by providing a wire diameter in the loop broader than that customarily used for normal length customer loops. The immediate effect was to decrease the loop resistance in comparison to a corresponding length of narrower gauge wire and to produce an overall resistance at the office which was comparable to those on normal length customer loops.

Alternatively, so-called "long-line" circuits have been used to service long customer loops by providing more sensitive responsive equipment which would respond to the lower current signaling and supervisory indications either on a per line basis or by grouping long line circuits in the central office and permitting a relatively larger number of long customer loops to gain access to a smaller number of long line circuits on a shared basis. An illustration of this type of range extension is disclosed in an application of A. Feiner-A. Zarouni-C. W. Zebe, Ser. No. 402,801, filed Oct. 7, 1964, now United States Patent 3,339,027, issued Aug. 29, 1967.

Although fully operative and useful for its intended purpose, this arrangement as disclosed for use in the No. 5 Crossbar telephone system was predicated on the treatment of all lines within a given horizontal group on the same basis. That is, all of the lines connected within a given horizontal group were required to be long loop customer lines or non-long loop customer lines, but not both.

On a conventional crossbar switch, a horizontal group includes all of the lines serviced by the same ten links; it will be appreciated, therefore, that restriction of a horizontal group to lines of only the same type may impose barriers with respect to distributing lines in a manner which would degrade the desired flexibility of assignment that might otherwise be exploited under varying equipment utilization and traffic conditions by distributing long loop lines as well as non-long loop lines within the same horizontal group.

It is therefore an object of this invention to provide for the admixture of non-long loop lines and long loop lines within the same horizontal group in a crossbar telephone switching system.

These and other objects and features of the invention may be achieved in a system which provides for the connection of long loop lines and non-long loop lines in selected line groups within the same horizontal group in which the lines are located. A bistable device indicative of a long loop call is connected to all of the line groups which include long lines. A different bistable device indicative of non-long loops is connectable to those line groups in which non-long loop lines are connected.

Provisions are made in the event that a non-long loop call is originated within a particular horizontal group which includes range extension equipment for use on long loop calls to bypass the range extension equipment in response to a mark delivered to the non-long loop bistable device.

When a long loop call is effected, a corresponding mark delivered to the bistable device indicative of a long loop call results in the insertion of the range extenders in the circuit.

The above and other objects and features of the invention may be readily comprehended from examination of the following specification, appended claim and attached drawing, in which:

Figure 1:
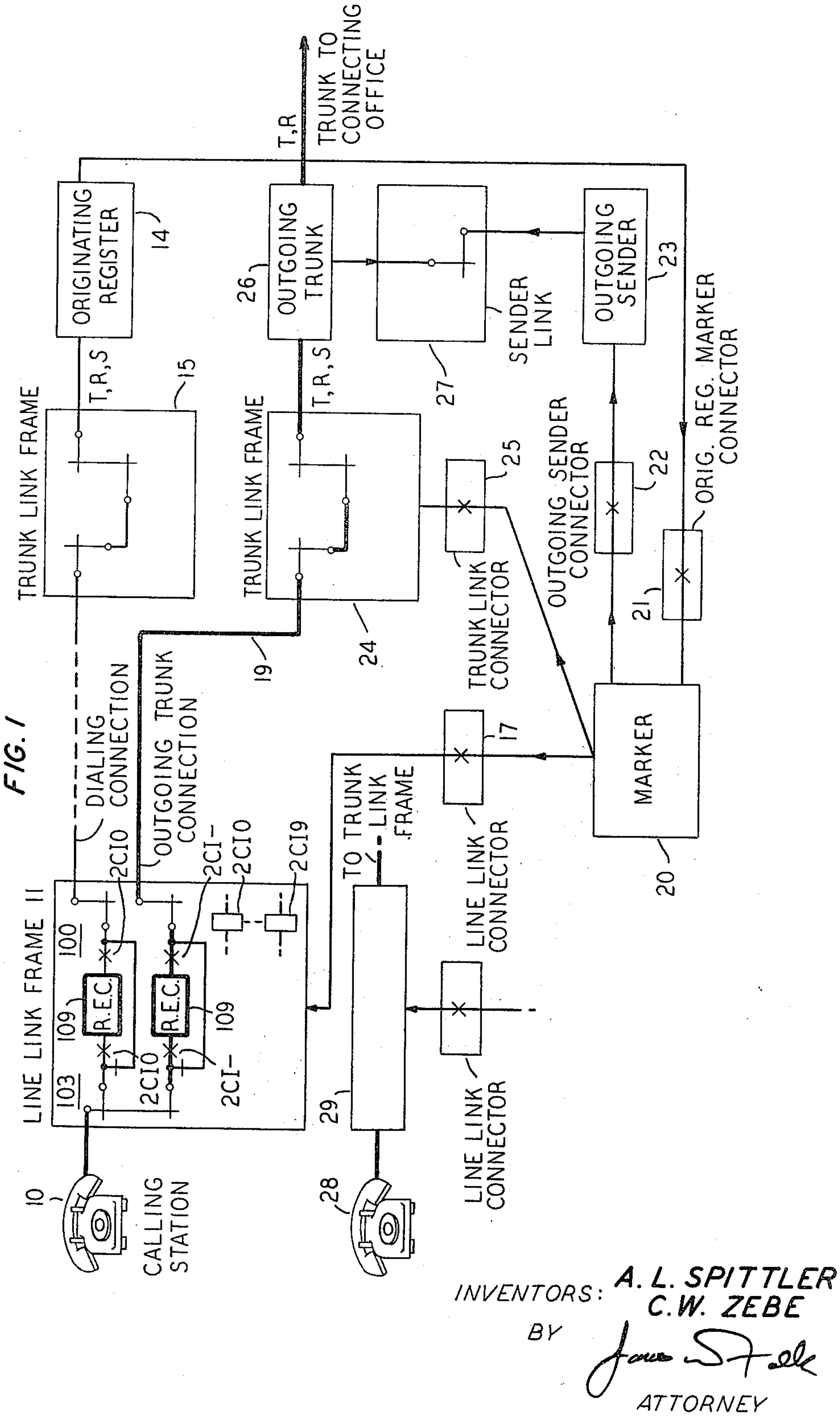
FIG. 1 shows in functional outline form portions of a No. 5 Crossbar Office as well as the placement of range extended and bypass equipment therein in accordance with one specific illustrative embodiment of our invention.
Figure 2:
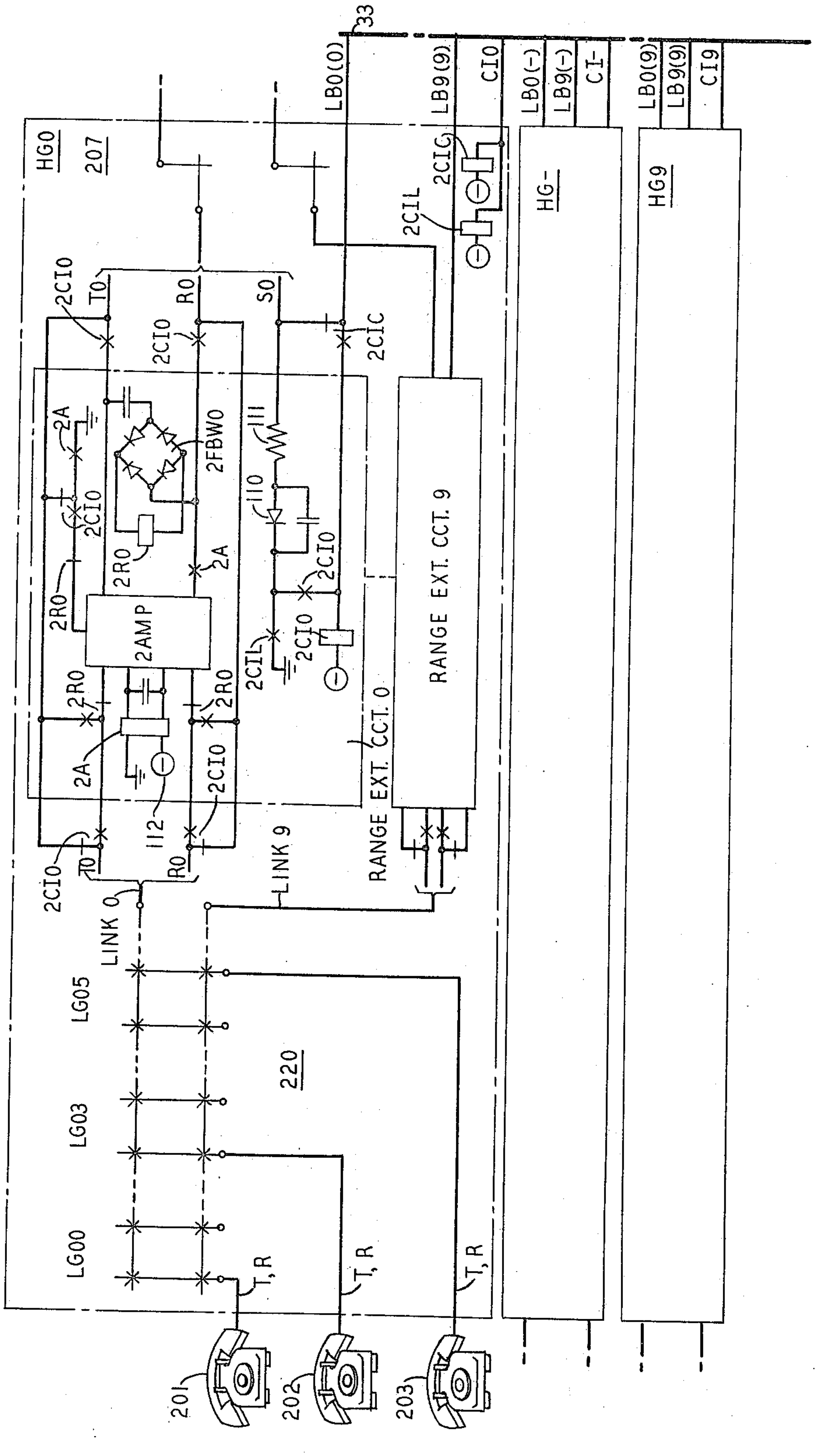
FIG. 2 shows a portion of the switching network and the link frame of the illustrative embodiment of FIG. 1.
Figure 3:
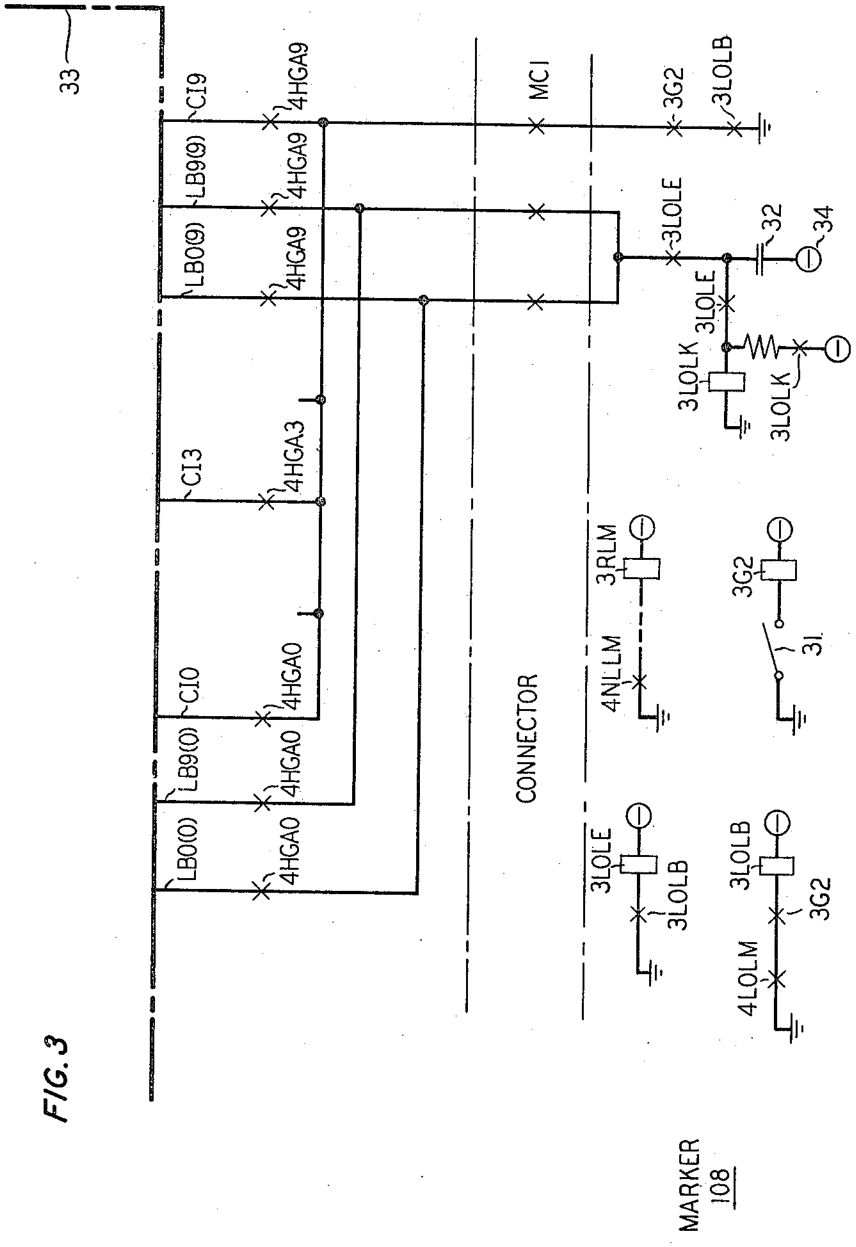
Figures 4, 5:
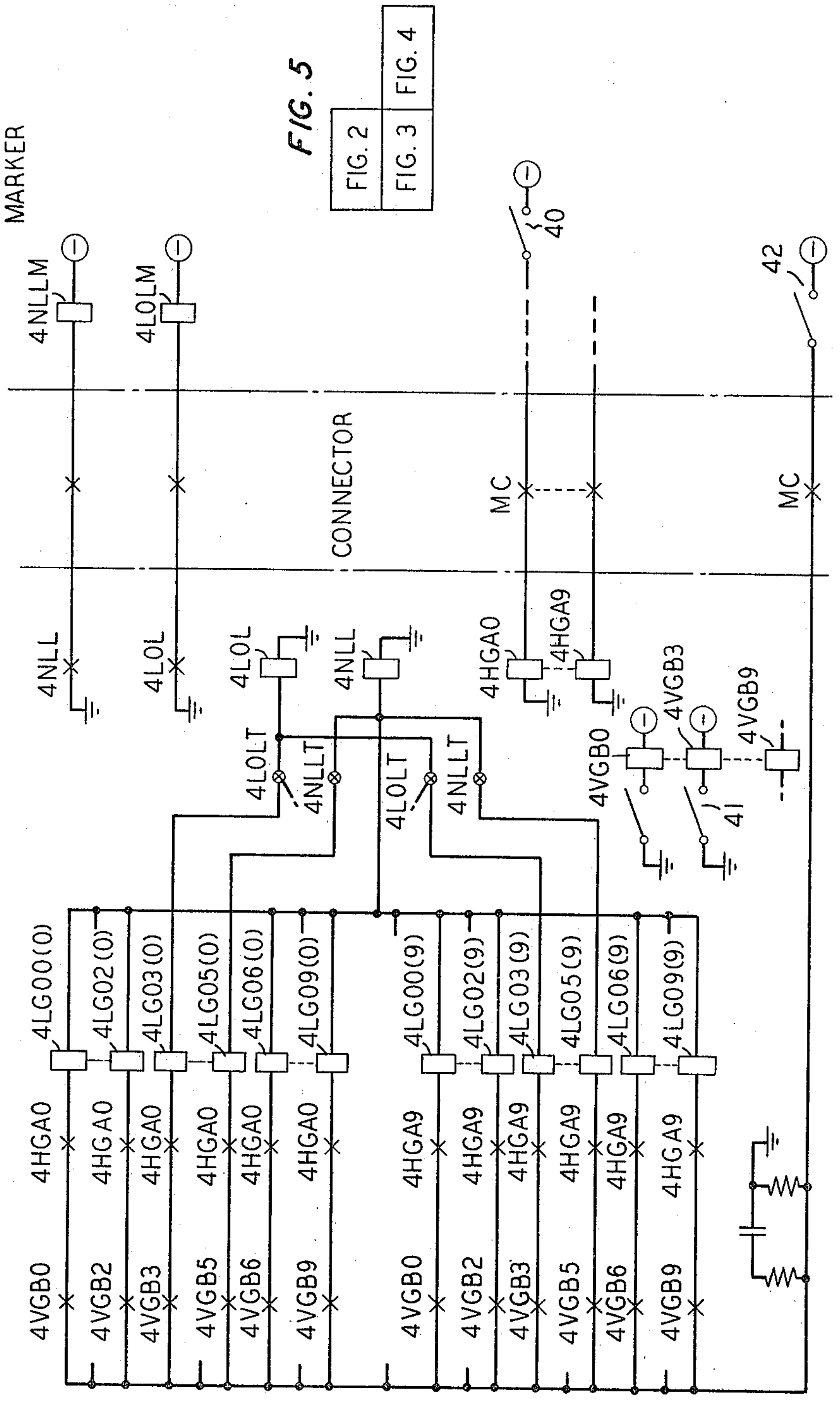

FIGS. 3 and 4 disclose portions of the marker circuit of the No. 5 Crossbar telephone switching system of the embodiment of FIG. 1 together with the line group relays of the line link frame; and FIG. 5 indicates the appropriate disposition of FIGS. 2–4.

Referring to FIG. 1, the range extender circuit 109 is shown in outline form intermediate the primary and secondary switches 103 and 100, respectively, of the line link frame 11. It is seen that the range extender circuit 109 may be included or bypassed in accordance with the condition of the contacts of relay 2CI0. Both the operation of relay 2CI0 and the details of a typical range extender circuit 109 are shown in detail herein with respect to FIGS. 2–4.

Although only calling substation 10 is illustrated as connected to line link frame 11, it is understood that additional substations may be connected to the same horizontal group served by the ten range extender circuits 109 of which only two are shown. It is also understood that ten horizontal groups may be conventioanlly incorporated within a line link frame. Each of the horizontal groups may conventionally include twelve so-called line groups in which each line group comprises 5 lines having access to the same ten links.

As will be shown herein, the origination of a call by station 10, when calling station 10 is included within a line group comprising long lines, will result in the operation of relay 2CI0 which, in turn, interposes range extender circuit 109 in series with the line link (assumed to be link 0) between the primary switch 103 and the secondary switch 100 of line link frame 11. The range extender circuit provides D-C signal repetition, as well as D-C gain for long lines, as explained further herein.

If, on the other hand, it is assumed that calling station 10 is a non-long line (having less than a predetermined resistance) included within the same horizontal group shown within the line link frame 11, range extension is unnecessary and, as a result, relay 2CI0 will not be operated and the range extender will be bypassed over the normally closed contacts of relay 2CI0. In this manner, substations which are coupled over long loops to the office as well as those which are coupled over non-long loops may share the same group of links (the same horizontal group) in a manner which provides for the inclusion of range extension circuitry when an individual link within a horizontal group is coupled to a long line, whereas the range extension circuitry is bypassed and connection is made directly between the primary and secondary switches of the crossbar switch line link frames when a non-long line is being served by a particular link.

The termination of substation lines on a line link frame and the trunk arrangement between line link and trunk link frames are disclosed in an article entitled "Trunking Plan for No. 5 Crossbar" by W. B. Graupner in the Bell Laboratories Record, October 1949, page 360, and in Patent 2,585,904 of A. J. Busch of Feb. 19, 1952, which latter is herewith incorporated by reference. It is understood that substations 10, 28, etc. are representative of a larger number or full complement of stations conventionally connected to the line link frames.

Line link frame 29 is illustrative of a conventional switch in which no range extension equipment is included.

When a calling subscriber at substation 10 goes off hook, a line relay, not shown herein, is operated which causes the line link frame 11 to energize a line link marker connector (not shown) to seize a marker. The line link marker connector thereupon transmits to the marker the equipment location of the calling line. This procedure is discussed in the above-referred-to Busch patent at column 7 et seq. During the course of the identification of the calling line, a horizontal group identification is effected in the manner shown, in part, in FIG. 4. Therein, a relay 4HGA–, indicative of the horizontal group, is shown as symbolically operated by manual switch 40. The specific manner of operation of the horizontal group relay is disclosed in the Busch patent at column 19 et seq. Following the operation of the horizontal group relay and a vertical group relay, a particular relay indicative of the line group in which the calling line appears, is energized. This procedure is shown in FIG. 4 and in the Busch patent at column 31. In accordance with the particular line group, relay 4LG– is energized, a relay 4NLL or 4LOL will be activated to indicate whether the calling line is a non-long line or a long line, respectively.

Based on this information, a mark will be delivered to the originating register which latter is eventually connected to the line link frame via the trunk link frame, as shown for originating register 14 in FIG. 1. Thereafter, the register will use a higher than normal voltage to receive dialing information from a calling line if a long line call is involved in a manner similar to that explained in detail in the aforementioned Feiner et al. patent.

When the called directory number has been stored in the originating register 14, a marker 20 is energized by the register 14 over an originating register marker connector 21. This procedure is described in the Busch disclosure at column 69 et seq. The originating register, in accordance with conventional practice, transfers to the marker 20 the equipment location and class of service of the calling substation as well as the number of the line link frame used in the dialing connection and the called directory number. The marker 20 thereupon obtains access to an outgoing sender 23 through an outgoing sender connector 22. When the outgoing sender connector 22 is engaged, the marker 20 obtains access to an idle trunk link frame 24 by means of a trunk link connector 25.

At this time, the sender 23 receives the called directory number from the marker and the marker also establishes a connection between the outgoing trunk 26 extending to the desired called office and the outgoing sender 23 over the sender link 27. For an explanation of the details of appropriate senders and sender link frames, reference may be made to articles entitled "Senders for No. 5 Crossbar" by L. T. Anderson, Bell Laboratories Record, November 1949, page 385, and "Sender Link Frames for No. 5 Crossbar" by R. A. Swift, Bell Laboratories Record, June 1950, page 258.

When a marker seizes the trunk line frame 24, the dialing connection may be released. However, in seizing the line link frame, the horizontal group relay is again operated, as described above, for the dial tone connection. Moreover, a vertical group relay is operated, as explained in detail in the Busch patent at column 31 and as will be described herein. Following the operation of the horizontal group and vertical group relays, a line group relay will be operated to identify a group of 5 lines within which the calling line is located. The specific manner of operation is described in detail in the Busch patent at column 31. Moreover, the definitions of vertical group, horizontal group, etc., are detailed in the Busch patent at column 16.

Following the operation of the line group relay, a particular relay 4NLL or 4LOL connected to the line group relays will be operated to indicate whether a non-long line or a long line is involved in the call, as shown herein. For a further description of marker operation, reference may be made to an article entitled "No. 5 Crossbar Marker" by A. O. Adam, Bell Laboratories Record, November 1950, page 502.

When the long line signal indication is delivered to the marker, in the manner described above, the marker will establish the connection to outgoing trunk 26 in a conventional manner, as described in the above-referred-to Busch disclosure. This will be over a path which includes range extender circuit 109 if a long line is included since relay 2CI0 will have been operated in the manner described above and in detail herein, or in bypass of the range extender circuit 109 if a non-long line is involved.

DETAILED DESCRIPTION OF ORIGINATING CALL

Assuming for illustrative purposes, that the horizontal group of line links 0–9 of FIG. 2 are arranged to couple the lines connectable to that horizontal group of the primary switch 220 with line link frames to the secondary switch 207 of the line link frames, it will be demonstrated that both non-long line groups as well as long line groups may be coupled to the same horizontal groups 0–9.

Moreover, it will be assumed that the five substations comprising line group LG00 of the horizontal group HG0 include all non-long lines whereas line group LG03 includes all long lines. It is therefore necessary when a call is initiated by substation 201 to arrange for bypassing the range extender circuits 0 through 9, in accordance with the particular link 0–9 utilized on the call. On the other hand, with respect to calls initiated by substation 202, range extension circuitry must be included within the line link circuit on both originating and terminating calls. The manner of operation of the range extender itself will be described in detail herein.

If a call is initiated at long line 202, a series of operations, described generally above and in detail in the above-referred-to Busch patent, are undertaken preparatory to connecting a marker to the line link frame. At this time, an indication is given to the marker that the line is a long line and that, in consequence, the originating register should employ the high voltage mode of operation in the manner described, for example, in the aforementioned Feiner et al. patent, and also generally above. After the dial tone marker has established the linkage to the originating register and controlled the register to employ the high voltage mode, the customer at substation 202 dials the called number. Thereupon, in accordance with conventional practice, described in detail in the above-referred-to Busch patent, the linkage between the calling substation and the originating register is dropped and a completing marker establishes a linkage to an idle trunk extending to the called customer. Subsequently, following the usual false cross and ground, continuity and other tests, also described in the Busch patent as well as the Feiner et al. patent, a so-called "call back" operation (Busch, column 94) is established to the calling line.

At this time, a path may be traced for the operation of relay 4HGA0, as shown in FIG. 4, over a path from battery, manual switch 40, contacts MC of the line link connector, winding of relay 4HGA0 to ground. Although the operation of the horizontal group relay 4HGA0 is shown only symbolically herein for clarity, reference may be made to the Busch patent at column 30 for detailed explanation.

Moreover, the vertical group relay indicative of the vertical group in which the calling line appears is also energized. For illustrative purposes, it is assumed that vertical group relay 4VGB3 is operated, as shown symbolically by manual switch 41. At this time, a path may be traced from the marker circuit at battery, symbolic manual switch 42, contacts MC of the connector, contacts of relays 4VGB3, 4HGA0, winding of relay 4LG03(0), terminal 4LOLT, winding of relay 4LOL to ground.

As shown in FIG. 4, relay 4LG03(0) corresponding to line group LG03 of horizontal group HG0 of FIG. 2 is connected to the long line terminal 4LOLT and, in consequence, to relay 4LOL, indicative of a long line call. On the other hand, relay 4LG05(0) indicative of line group LG05 of horizontal group HG0 of FIG. 2, is connected to terminal 4NLLT and relay 4NLL, indicative of non-long line calls. The cross connection between the line group relays 4LG– and the terminals 4NLLT and 4LOLT may be altered by simple wiring changes, in accordance with the actual status of the lines within the respective line groups.

Thus, if traffic or other factors dictate, it is possible to include all non-long lines within the line group LG03 of horizontal group HG0 and, thereupon, the connection from relay 4LG03(0) of FIG. 4 need only be transferred to terminal 4NLLT in lieu of terminal 4LOLT to insure that range extension circuitry is not included during the call made by lines within the non-long line group.

However, when substation 202 within line group LG03 (a long line group) initiates a call, relay 4LOL is energized, in turn operating relay 4LOLM in the marker circuit.

Operation of relay 4LOLM results in the operation of relay 3LOLB after the usual marker tests are completed, as indicated by the operation of relay 3G2 (shown symbolically actuated by manual switch 31). Relay 3LOLE operates at the contacts of relay 3LOLB. The operation of relay 3LOLE is a verification that relay 3LOLB has operated. In addition, a path may be traced for the operation of relays 2CIC and 2CIL from ground, contacts of relays 3LOLB, 3G2, connector contacts MC1, contacts of 4HGA0, conductor CI0, cable 33 windings of relays 2CIC and 2CIL in parallel. Operation of relay 2CIC transfers conductors LB0(0), etc. from the sleeve conductor S0 to the corresponding relays 2CI0, etc.

Relay 2CI0 thereupon operates from 178 volt battery 34, capacitor 32, contacts of relay 3LOLE, connector contacts, contacts of 4HGA0, conductor LB0(0), contacts of relay 2CIC, winding of relay 2CI0 to negative battery; relay 3LOLK also operates but is released, as described below.

Thereupon, relay 2CI0 locks operated over the contacts of relays 2CI0 and 2CIL. The same locking path is extended back to the marker to release relay 3LOLK and verify that relay 2CIO was operated. Subsequently, relays 2CIL and 2CIC are released by the marker, whereas relay 2CIO locks operated to the sleeve conductor over resistor 111 and diode 110.

Operation of relay 2CI0 switches the voice amplifier 2AMP into the circuit as well as high voltage supervisory relay 2A. Relay 2A thereupon operates over the loop extending from substation 202, the switch train, link O, conductors TO and RO, contacts of relay 2CI0, and contacts of relay 2RO. Operation of relay 2A over this path results in the activation of amplifier 2AMP over a ground start path including contacts of relays 2A, 2CI0 and 2RO. Moreover, relay 2A repeats the switch hook signals of substation 202 at the contacts of relay 2A in conductor RO extending to the secondary switch 207 of the crossbar switch line link frame. Audible ringing is delivered to the customer in a conventional manner until the called customer answers. Thereupon, a path extends from the calling customer at substation 202 through the crossbar switch train including line group LGO3, link O of horizontal group HGO, conductors TO and RO, contacts of relay 2CI0 and 2RO, voice amplifier 2AMP, contacts of relay 2CI0 in conductor TO and contacts of relays 2A and 2CI0 in conductor RO to secondary switch 207 of the line link frame and, thereafter, to the trunk line frame, not shown herein.

If, instead, a call had been originated by substation 203, which was included within non-long line group LGO5, relays 2CI0 would not be operated and, in consequence, the range extender would not be included within the link circuit. Thus, a path may be traced in FIG. 4 for the operation of relay 4LG05(0), unique to line group LG05 within the horizontal group HGO from negative battery, symbolic switch 42, connecter contacts MC, contacts of relays 4VGB5, 4HGA0, winding of relay 4LG05(0), terminal 4NLLT, winding of relay 4NLL to ground. It is assumed that relay 4VGB5 (not shown) has previously operated in a manner similar to that described above.

In view of the operation of relay 4NLL, relays 2CIC and 2CIL are not opearted and, in consequence, relay 2CI0 is not operated. Instead, relay 4NLLM is operated and causes the operation of relay 3RLM which subsequently initiates conventional marker release operations. Thereafter, a path may be traced from substation 203, line group LG05 of the primary switch of the line link frame, link O, conductors RO and TO in parallel, normally closed contacts of relay 2CI0, conductors TO and RO extending to the secondary switch 207 of the line link frame and, thereafter, to the trunk circuit (not shown). It is apparent that this path is exclusive of the range extender circuit and, in consequence, the non-long line substation 203 is provided with a direct electrical connection between the primary and secondary switches of the line link frame.

It is also noted from FIG. 4 that line group LG00 and its corresponding relay 4LG00(0) are coupled to relay 4NLL and, as a result, a call from substation 201, which is a non-long line, will also result in bypass of the range extension circuit since relay 2CI0 will not be operated.

DETAILED DESCRIPTION OF TERMINATING CALL

After the initial conventional operation in extending the terminating connection and subsequent to the usual false cross and ground and continuity tests referred-to above in connection with an originating call, the particular line group relay associated with the called line will be operated. If it is assumed that substation 202 is the called line, relay 4LG03(0) will be operated in the manner described above. Here again, it is presumed that link O has been selected to extend the connection. If link O were busy and another link, for example link 9, were selected, relay 4LG03(9) would have been operated instead. Thereafter, relay 2CI9 (not shown) will be operated in the manner described above in an originating call. Subsequently, ringing is completed in a conventional manner from the trunk circuit over secondary switch 207, conductors TO and RO in parallel, contacts of relay 2CI0 to bridge rectifier circuit 2FWB0. Relay 2RO is responsive to each ringing cycle and causes the range extender circuit to be bypassed over the contacts of relay 2RO.

When the called customer at substation 202 answers during the ringing interval, ringing is tripped by the conventional ring-trip relay (not shown) directly over the loop. If the customer at substation 202 answers during the silient interval, relay 2A is operated over the loop and at the contacts 2A repeats the answer indication to operate the ring-trip relay. Operation of relay 2A also energizes amplifier 2AMP over the contacts of relays 2A, 2CI0 and 2RO in a manner similar to that described above for an originating call.

If it is assumed that the called customer is connected to a non-long line within the same horizontal group, for example substation 201, it will be seen that the range extension equipment in the link selected to extend the connection will not be operated. Thus, in reference to FIG. 4, relay 4LG00(0) will be operated to indicate that the called line is included within line group LG00 of horizontal group HG0. The operating path is over the contacts of relays 4VGB0, 4HGA0, winding of relay 4LG00(0), winding of relay 4NLL to ground. In view of the operation of the non-long line indicating relay 4NLL, relay 2CI0 will not be operated and the range extension circuitry will not be cut in, as described above.

When the calling customer disconnects, relay 2A is released and de-energizes amplifier 2AMP. Moreover, the contacts of relay 2A effect the release of the conventional trunk supervisory relay, not shown. The latter effects the removal of ground from the sleeve conductor in a conventional manner described in the above-referred-to Busch patent to release relay 2CI0 and the switch train.

When the called party disconnects, the trunk circuit initiates conventional delayed release of approximately 30 seconds. After this interval, the switch train is released and relay 2CI0 releases, in turn releasing relay 2A.

It is to be understood that the above-described arrangements are illustrative of the application of the principles of the invention. Numerous other arangements may be devised by those skilled in the art without departing from the spirit and scope of the invention.

What is claimed is:

1. A telephone switching system comprising a central office including a first plurality of relatively high impedance lines, a second plurality of relatively lower impedance lines, a first plurality of line link frames connected to said first plurality of lines, a second plurality of line link frames connected to certain of said second plurality of lines, said line link frames including primary switches and secondary switches, range extender means selectively connectable between said switches of said first plurality of line link frames, originating register means having a relatively high and a relatively lower voltage source, marker means for controlling the connection of said first plurality of line link frames to said originating register in response to a calling condition on one of the lines connected to said first plurality of frames, relay means in said first plurality of line link frames responsive to either a calling condition or a called condition on one of said high impedance lines for generating a characteristic signal indication, said marker means including additonal relay means responsive to the reception of said characteristic signal indication, switching means in said register means responsive to the operation of said marker relay means for actuating said high voltage source to enhance the sensitivity of said register means in response to dial pulses over said high impedance lines, a trunk circuit, means in said marker means effective during the connection of said first plurality of line link frames to said trunk circuit for delivering a signal to said range extender means to connect said range extender means in circuit between said primary and secondary switches, means in said register means effective in response to calling conditions on said lower impedance lines for governing the actuation of said low voltage source in said register means, ranging selection means, and means in said first plurality of line link frames effective in response to ringing signals from said ringing selection means during a terminating call to said high impedance lines for bypassing said range extender means in circuit between said primary and secondary switches, characterized by means for connecting certain others of said lower impedance lines to said first plurality of line link frames, a plurality of line group relays individual to groups of said high impedance lines and groups of said certain other lines connected to said first plurality of line link frames, each of said line group relays actuated responsive to either a calling condition or a called condition on one of the lines in the respective group, means connectable in series with said line group relays unique to said certain other lines for indicating said lower impedance lines, and means in said marker means governed by the actuation of said lower impedance line indicating means for delivering a signal to said range extender means to bypass said range extender means in circuit between said primary and secondary switches.

References Cited

UNITED STATES PATENTS 3,339,027 8/1967 Feiner et al. ---------- 179—16

KATHLEEN H. CLAFFY, Primary Examiner

J. S. BLACK, Assistant Examiner